(12) United States Patent
Fischer

(10) Patent No.: US 6,775,024 B1
(45) Date of Patent: Aug. 10, 2004

(54) METHOD FOR SELECTIVELY DETECTING AND READING A CHARACTER STRING

(76) Inventor: Gert Fischer, Neusser Strasse 56, D-41564, Kaarst (DE)

( * ) Notice: Subject to any disclaimer, the term of this patent is extended or adjusted under 35 U.S.C. 154(b) by 0 days.

(21) Appl. No.: 09/446,428

(22) PCT Filed: Jun. 17, 1998

(86) PCT No.: PCT/EP98/03644

§ 371 (c)(1),
(2), (4) Date: Apr. 10, 2000

(87) PCT Pub. No.: WO98/58341

PCT Pub. Date: Dec. 23, 1998

(30) Foreign Application Priority Data

Jun. 18, 1997 (DE) .......................................... 197 25 790

(51) Int. Cl.[7] .............................................. G06K 15/00
(52) U.S. Cl. ..................................... 358/1.15; 358/1.12
(58) Field of Search ........................ 358/1.1, 1.9, 1.12, 358/1.13, 1.15, 1.17, 1.18; 382/199, 229; 704/1, 8–10, 530; 707/4, 6, 532, 535, 534; 710/8, 62

(56) References Cited

U.S. PATENT DOCUMENTS 5,978,801 A * 11/1999 Yuasa ............................ 707/6
6,014,460 A * 1/2000 Fukushima et al. .......... 382/177
6,032,165 A * 2/2000 Andrews et al. ............. 707/536
6,088,713 A * 7/2000 Okuda et al. ................ 707/534
6,243,701 B1 * 6/2001 Shih et al. ...................... 707/7
6,269,189 B1 * 7/2001 Chanod ........................ 382/229
6,356,866 B1 * 3/2002 Pratley et al. ................... 704/9

* cited by examiner

*Primary Examiner*—Gabriel Garcia
(74) *Attorney, Agent, or Firm*—Blakely, Sokoloff, Taylor & Zafman

(57) ABSTRACT

The invention relates to a method for selective detection and readout of at least one character string, wherein the at least one character string is input into a data processing unit and is incorporated into a primary output signal stream output at an output interface of the data processing unit, wherein the number of characters of each character string in each case does not exceed a predetermined maximum number and wherein position control signals are allocated to each character string and are inserted into a predetermined portion of the primary output signal stream, wherein the position control signals can cause a primary output device which is capable of being connected to the output interface to output the character string allocated thereto in each case at a predetermined output position of an output medium.

24 Claims, 4 Drawing Sheets

```
esc$ = CHR$(27): lf$ = CHR$(13); nul$ = CHR$(10)
'WIDTH "LPT1:", 255
'OPEN "LPT1:" FOR RANDOM AS #1

OPEN "COM2:9600,N,8,1" FOR OUTPUT AS #1
PRINT #1, esc$; "E022801;0228"; lf$; nul$;
                    20   x    y
PRINT #1, esc$; "PC00;0150,0010,1,1,D,00"; lf$; nul$;  ⎫
PRINT #1, esc$; "PC01;0150,0050,1,1,D,00"; lf$; nul$;  ⎪
PRINT #1, esc$; "PC02;0150,0090,1,1,C,00"; lf$; nul$;  ⎬ I.
PRINT #1, esc$; "PC03;0300,0090,1,1,C,00"; lf$; nul$;  ⎪
PRINT #1, esc$; "PC04;0450,0080,1,1,C,00"; lf$; nul$;  ⎪
PRINT #1, esc$; "PC06;0360,0145,2,1,D,00"; lf$; nul$;  ⎭

PRINT #1, esc$; "PB05;0140,0120,256,070,0,1,1"; lf$; nul$;
PRINT #1, esc$; "rB05; 456726727791"; lf$; nul$;
     22      20'                                 21
PRINT #1, [esc$; "rC00; Bonduell Gemusemais 850 ml]; lf$; nul$; ⎫
PRINT #1,  esc$; "rC01; sehr fein"; lf$; nul$;                  ⎪
PRINT #1,  esc$; "rC02; 440125520"; lf$; nul$;                  ⎬ II.
PRINT #1,  esc$; "rC03; 885421520"; lf$; nul$;                  ⎪
PRINT #1,  esc$; "rC04; 968475520"; lf$; nul$;                  ⎪
PRINT #1,  esc$; "rC06; DM 5,95"; lf$; nul$;                    ⎭
PRINT #1,  esc$; "10001C"; lf$; nul$;        ← III. 21
     22
PRINT #1, [esc$; "rC00; Kupferberg Gold 0,7 l]; lf$; nul$; ⎫
PRINT #1,  esc$; "rC01; trooken/herb"; lf$; nul$;          ⎪
PRINT #1,  esc$; "rC02; 846466520"; lf$; nul$;             ⎬ II.
PRINT #1,  esc$; "rC03; 756565620"; lf$; nul$;             ⎪
PRINT #1,  esc$; "rC04; 952684440"; lf$; nul$;             ⎪
PRINT #1,  esc$; "rC06; DM 9,99"; lf$; nul$;               ⎭
PRINT #1,  esc$; "rB05; 909090909090"; lf$; nul$;
PRINT #1,  esc$; "10001C"; lf$; nul$;        ← III.
CLOSE
END
```

FIG. 4A

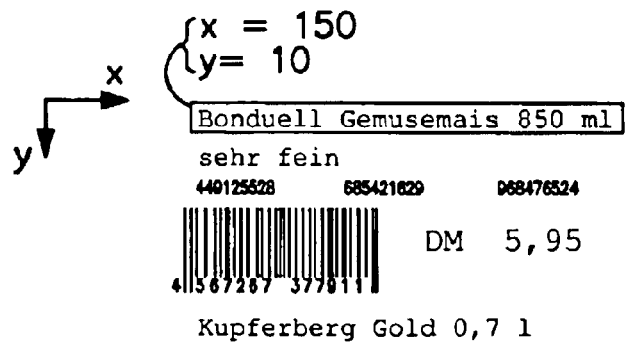

FIG. 4B

METHOD FOR SELECTIVELY DETECTING AND READING A CHARACTER STRING

FIELD OF THE INVENTION

The invention relates to a method for selective detection and readout of at least one character string, wherein the at least one character string is input into a data processing unit and is incorporated into a primary output signal stream output at an output interface of the data processing unit, wherein the number of characters of each character string in each case does not exceed a predetermined maximum number and wherein position control signals are allocated to each character string and are inserted into a predetermined portion of the primary output signal stream, wherein the position control signals can cause a primary output device which is capable of being connected to the output interface to output the character string allocated thereto in each case at a predetermined output position of an output medium.

BACKGROUND OF THE INVENTION

Data processing units of the most varied construction and size are used on a large scale for the most varied tasks, for example for controlling and monitoring equipment, installations and automated processes, for office and communication tasks, in research and development as well as in the entertainment sector. For output of the processed data a large number of the most varied data processing units are connected to the most varied data output devices. The data processing units include for example mainframe computers, PCs, mini- and microcomputers, but also control and regulating devices. Output devices can be display devices, such as cathode ray tubes or LCD displays, or also printers or plotters. The output devices are connected at an interface to the data processing unit. The interface can be a standard interface, for example a parallel Centronics interface of a serial RS-232 interface. The output interface of the data processing unit must be adapted to the input interface of the output device. With regard to the hardware this means first of all that the signals emitted by the data processing unit at the output interface must be adapted as regards their voltage and current level and as regards the time defaults to the requirements of the output device. Furthermore, the serial or parallel output signal sequences should also be adapted in their logical significance, for example as regards the coding used, the control signals used and the protocol used, to the requirements of the output device.

A vast number of data processing units can receive, process and output character strings. A character string should be understood as a sequence of coded characters. A character may for example be a text character (letter, number, special character) or a pseudo-graphics character. Characters are usually coded with the aid of a predetermined number of bits, wherein the number of bits determines the number of different characters which can be coded by the code. There are a series of standard codes for coding the most common characters, for example ASCII code or ANSI code.

The majority of available output devices can receive signal streams containing character strings of a standard code from serial or parallel interfaces and process them for output. In addition, the majority of output devices require signals which control the positioning of the output characters on an output medium. In the case of a printer these are for example characters which indicate the start of a new page, a new line or a specific position in the line, as well as the font used, the size of the character or color. Displays require signals which for example display the position of the characters to be output on the screen or clearing of the screen. The various known output devices (printers, displays) use a large number of the most varied control signals and control signal sequences.

In an existing data processing unit it is frequently necessary to change the connected output device for a new one or to add a further output device. Then the problem often occurs that the control signals output from the output interface by the data processing unit under the control of the programs run on the data processing unit can no longer be completely and correctly interpreted by the new or additional output device. Even when a standard hardware interface is used with the same signal levels and time signal sequences, as a rule only a proportion of the transmitted characters are correctly interpreted by the output device. In particular the control signals used for formatting and positioning of the output characters can often no longer be correctly interpreted by the new or additional output device.

Similar problems occur when parallel to or as a replacement for an existing output device another output device intended to further process and output only a proportion of the output character strings is to be connected to the data processing device. A typical example of this is the connection of a printer for printing address labels parallel to a printer printing standard letters. The address label printer should filter out from the output signal stream output by the data processing unit to the letter printer only the address components located in the letterhead and should print these on an address label. It should ignore the rest of the data.

SUMMARY OF THE INVENTION

The object of the invention therefore is to be able to selectively detect and read out character strings in an output signal stream from a data processing unit without a subsequent intervention into the existing software of the data processing unit being necessary and without the need for the user to have knowledge of the software which generates the output signal stream.

This object is achieved according to the invention by a method with the features of claim 1. The character strings to be selectively detected and read out are the character strings input into a data processing unit in normal operation which are incorporated into a primary signal stream output at an output interface of the data processing unit. The number of characters of each character string does not exceed a predetermined maximum number. The input of the character strings and the incorporation into the primary output signal stream is usually controlled by the programs running on the data processing unit. A character string is understood to be not only the input sequence of an operator which is for example made visible on an input mask of a screen of the data processing unit but also the sequential output signal sequence to the output interface which is generated therefrom. The character string does not have to be input into the data processing unit by an operator; it can also reach an input area by output of a program running on the data processing device or another device. A data processing device should be understood to be any device or part of a device to which a character string can be input in coded form and which outputs this character string, possibly changing the coding, at an output interface. The maximum number of characters of each character string is predetermined by the software running on the data processing unit and is indicated for example by the width of an input field visible in an input mask of a screen. Position control signals are allocated to each character string and inserted into a predetermined portion of the primary output signal stream, wherein the position control signals can cause a primary output device which is capable of being connected to the output interface to output the character string associated therewith in each case at a predetermined output position of an output medium. The predetermined portion of the primary output signal stream is for example that portion which describes a page of a screen or a printer and is initiated or terminated by a corresponding control signal. The output medium is for example a printed page or a label or a page of the screen. The position control signals are those control signals which can influence the output position of a character string on the output medium. In addition further control signals can be incorporated into the output signal stream which for example control the way the characters are represented.

The method according to the invention is characterized in that a conversion device connected to the output interface of the data processing unit is put into a configuration mode, wherein in the configuration mode a marking character string is input into the data processing unit instead of each character string which is to be selectively detected. Each marking character string forms a unique sequence of characters which does not occur in the primary output signal stream output during the normal operation. The number of characters of the marking character string is equal to the maximum number of characters of the appertaining character string. In this case it is advantageous that for input of the marking character string the program usually running on the data processing unit can be used. The marking character string is input like a normal character string at the location provided by the program sequence (for example in the displayed input mask ). Then each marking character string (controlled by the existing program) proceeds with allocated position control signals into the primary output signal stream of the data processing device. The primary output signal stream is received by the conversion device and searched for marking character strings, and when a marking signal string is detected position data identifying its point of origin in the primary output signal stream is obtained from the position control signals allocated to the particular marking character string and inserted in the predetermined portion of the primary output signal stream, and this position data is stored together with the number of characters of the marking character string in the conversion device. Since the length of the marking character string is equal to the maximum length of the character string which it replaces in the configuration mode, by storage of the length and of position data identifying the point of origin of the marking character string data about the end of the marking character string is also simultaneously stored.

After this the conversion device is put into an operating mode in which the primary output signal stream is received, current position data is obtained from the received position control signals, the current position data is compared with each of the stored items of position data and when the current position data corresponds to stored position data the appertaining character string is read out from the primary output signal stream. The position data "learned" in the configuration mode is used for the respective character string in the operating mode in order to detect and read out any character string at the location thus marked of the primary output signal stream. The conversion device "converts" the received output signal stream into a "stream" of selectively read out character strings. The character strings which are read out can then be output by the conversion device or can be further processed in the conversion device. With the aid of the method according to the invention it is possible to read out from an output signal stream any character string which always occurs allocated to the same position data, without having a knowledge of the software generating the output signal stream. No knowledge about the control signals used is necessary. In the case of repeated output of different character strings allocated to the same position data (for example when sending out standard letters with changing addresses in the address field of the letters) the conversion device selectively reads out the appertaining character strings each time.

In a further development of the method according to the invention, a page of a two-dimensional output medium is defined by the predetermined portion of the primary output signal stream. The term "page" in the widest sense should include all paper page formats of a printer as well as pages of the size of a label or screen pages, also in the extreme case even a single output line. Moreover lines and columns of the page are defined by the position control signals preceding the character string to be detected in the predetermined portion, wherein the output position of a character of the character string is fixed unambiguously by a column number and a line number. In configuration mode a column number and a line number is stored as position data for each marking character string. This embodiment of the method according to the invention is suitable for all output devices which output characters exclusively in fixed predetermined lines and within the lines at fixed predetermined positions (columns), for example alphanumeric terminals as well as a large number of conventional printers. The line and column numbers stored as position data preferably correspond to the output positions of the first character in each case of the marking character strings. Thus they also correspond to the output position of the first character in each case of the appertaining character strings in the operating mode. In the operating mode a current line number and a current column number are obtained in each case as position data from the received position control signals and character strings. When the current line/column numbers correspond to the stored line/column numbers the subsequent characters are read out from the output signal stream until either the maximum number of characters of the character string is reached or a character string end signal is detected. The character string end signal can for example be a control signal for line shifting or a tabulator control signal. The position data obtained from the line number and the column number can be a concatenation of both numbers or a binary number calculated from both numbers. The line and column number are preferably stored as position data in separate counters. When the position control signals comprise those signals which indicate the start of a new page or of a new line, then in the preferred embodiment a line counter or a column counter is correspondingly reset as soon as a position control signal indicating the start of a new page or respectively of a new line is detected.

In the configuration mode the position control signals and character strings belonging to a page of the output medium are in each case advantageously buffered in the conversion device. Then the buffered character strings are searched for marking character strings. When a marking character string is found the line number to be stored as position data and the column number to be stored are obtained from the preceding position control signals and character strings of the page. Preferably the position control signals and character strings preceding the marking character strings are first of all searched until a signal indicating the start or the end of a line has been found. In this case a column counter is incremented when each of the characters preceding the marking character string is exceeded. Then the position control signals preceding the marking character string are searched until a character indicating the start of the page is found. In this case a line counter is incremented when each character effecting a line shift is exceeded. The resulting counter readings are stored as position data.

In a further development of the invention the conversion device has two page stores. The portions of the primary output signal stream which form a following page of the output medium are buffered in a page store. At the same time in the configuration mode the portions of the primary output signal stream which form the preceding page of the output medium and are buffered in the other page store of the conversion device are searched for marking character strings and the position data is obtained from the buffered portions.

In an alternative embodiment of the method according to the invention, for each character string an unambiguously allocated part-sequence of position control signals is inserted into the predetermined portion of the primary output signal stream, and with the aid of the part-sequence of position control signals the output device is enabled to determine the output position of the character string. In the configuration mode the predetermined portion of the primary output signal stream is buffered and the part-sequence allocated to a marking character string in the predetermined portion is used in order to obtain the appertaining position data. In the operating mode the part-sequence allocated to a character string is used in order to obtain the current position data. This embodiment of the method according to the invention is used on those output devices which receive from the data processing unit a signal stream from which no line and column data can be obtained by "counting in". These output devices, for example some heat transfer printers for labels, receive control sequences in which a position of a character string is coded in a special command. Such printers for example receive a signal stream in the form of a sequence of program commands in a special printer programming language. The program commands contain control commands which fix the position of a specific output, commands which represent the content of the output, for example the content of a character string, and commands which finally fix the start of printout and the number of copies. In such a case the software of the output device first of all generates from the program sequence transmitted to it the locations, formats and contents of the character strings to be output. In this embodiment of the method according to the invention, in the configuration mode after detection of a marking character string (e.g. in a command) the buffered predetermined portion of the primary output signal stream is searched for the allocated position-identifying part-sequence, in which case it is possible to use either data about a relative position of the part-sequence in relation to the marking character string or knowledge about the occurrence of predetermined control signals within the part-sequence. This knowledge about the relative position or specific fixed contents of the position-identifying part-sequence are preferably obtained ("learned") in the configuration mode in that on the one hand a plurality of different marking character strings are incorporated into a predetermined portion of the primary output signal stream and on the other hand the same marking character strings are incorporated at different locations in successive predetermined portions of the primary output signal stream.

In a preferred embodiment the part-sequence immediately precedes the character string or immediately runs on from it. Then a portion of the part-sequence itself can be stored as position data. This portion contains for example an identification character string which is unambiguously allocated to the position of the particular marking character string in the configuration mode or to the character string to be read out in the operating mode. The identification character string is for example a serial number associated with the character string. In addition the portion of the part-sequence stored as position data can include an output command which causes the output device when decoding the printer command to output the character string designated in the printer command by the identification number. Since the printer command allocated to this identification number occurs only once in the portion of the primary output signal stream allocated to each page of the output medium, it is suitable as position data.

In a preferred embodiment the part-sequence immediately precedes the character string, wherein in the operating mode the received position control signals are continuously compared with each stored part-sequence and when it is detected that they correspond the characters immediately following the part-sequence are read out of the buffered portions of the primary output signal stream until the maximum number of characters of the character string which are allocated to the part-sequence is reached or a character string end signal is detected.

The marking character string is preferably at least four characters long and contains at least one character which represents the respective maximum number of characters in the marking character string. The remaining characters of the marking character string are preferably identical but different from the characters of any other marking character string. In a preferred embodiment the second and the third character of the marking character string represent the maximum number of characters and the remaining characters represent any letters. A marking character string for marking a character string with 10 characters reads for example: "A10AAAAAAA". In almost all cases which might come into consideration of the use of programs running on the existing data processing unit it is possible to input such a marking character string. In normal operation such a character string occurs with very low probability. Moreover, the marking character string contains redundant information about its length. If in particular in the case of short marking character strings which are four, five or six characters long the case should occur that apart from such a marking character string an identical character string should occur in the "normal" remaining output signal stream, then the operator merely needs to change the letters used, for example to input the rare letters "Y" in order to create a detectable unique marking character string.

In a preferred further development of the method according to the invention not only is the character string selectively read out of the primary output signal stream but after readout by the conversion device a secondary output signal stream depending upon the at least one character string which has been read out is output to a secondary output device connected to an output interface. In this method basically a received primary output signal stream is converted into a secondary output signal stream. Specific data contained in the primary output signal stream is detected and processed and a secondary output signal stream dependent upon this data is generated. For example depending upon the content of a character string which has been read out the conversion device can retrieve data previously stored in the conversion device and incorporate it into the secondary output signal stream. This can take place for example with the aid of a lookup table in which the character strings which might possibly be read out are in each case associated with the data to be output in the secondary output signal stream.

In a preferred further development of the method according to the invention the secondary output signal stream contains signals which cause the secondary output device to output a character sequence which is dependent upon the character string read out. With this method it is possible for example for the character strings output by the data processing unit to be output on a printer which can receive exclusively graphics pixel data. The conversion device for example selectively reads out the character string to be output and allocates corresponding pixel data to each character read out. Then the pixel data are positioned at corresponding memory locations in an output memory so that they form a graphics character string. Then the output memory can be read out pixel by pixel to the graphics printer.

In another embodiment the secondary output signal stream can also contain the character string which has been read out in a character code. Also mixed forms of the two methods are conceivable in which the secondary output signal stream contains the character strings which have been read out both as a character code sequence and as graphics pixel data.

In a further development of the method according to the invention, in the configuration mode apart from the number of characters in the marking character string (=maximum number of characters in a character string) an item of output data is allocated and stored for each stored item of position data. The output data defines the content and the location of the output of the character sequence dependent upon the character string which has been read out. Thus it is possible to allocate individual items of data about the character sequence of the secondary output signal stream to each character string which has been read out. With regard to the content of the character sequence the output data defines for example whether the character sequence is identical with the character sequence which has been read out or which portions of the character sequence which has been read out should be converted into the secondary output signal stream. With regard to the location of the output of the character sequence, lines and columns for example or other two-dimensional co-ordinate details of an output medium are defined.

The secondary output signal stream is preferably formed from output data stored in an output memory of the conversion device. The character strings which have previously been read out of the primary output signal stream are written into predetermined output memory locations of the output memory as part of the output data (before the formation of the secondary output signal stream). In the configuration mode at least one predetermined output memory location is allocated to each stored item of position data as output data. In the configuration mode the output memory location is preferably allocated in such a way that a pattern character string is stored at the at least one predetermined output memory location, wherein the pattern character string stands in a predetermined relation to the marking character string allocated to the stored position data. Then in each case after the detection of a marking character string the output memory is searched for pattern character strings, and when a pattern character string is found the output storage location thereof is stored in association with the position data. The pattern character string and the allocated marking character string preferably constitute identical character sequences. However, in alternative embodiments it is conceivable for example that the pattern character string constitutes lower case letters of an alphabet whilst the allocated marking character string constitutes the identical upper case letters.

The output information about the output location is obtained with the aid of the pattern character string in the configuration mode in a similar manner to obtaining an item of position data allocated to a marking character string. In both cases a character string is used which does not occur or only has only a very low probability of occurring in the rest of the primary output signal stream or in the rest of the secondary output signal stream. With the aid of a searching process a search is carried out for the marking or pattern character string in a memory which stores portions of the respective output streams. The items of data which unambiguously identify the location of the particular character string in the particular output signal stream are then stored and allocated to one another.

In a preferred further development of the method according to the invention, in the configuration mode an input mask associated with the output medium of the secondary output device is displayed on a display device for storage of the pattern character string in the output memory. A pattern character string is input by a user at an input location of the input mask. Then the pattern character string is transmitted to an output storage location allocated to the input location. This is preferably achieved by connection of the conversion device in the configuration mode to a further data processing unit. The pattern character string is input into an input mask displayed on the display device of the further data processing unit under the control of a program running on the further data processing unit. The pattern character string is then transmitted together with other output data from the further data processing unit into the output memory of the conversion device. In this embodiment of the method according to the invention two learning processes are carried out one after the other or in parallel in the configuration mode, by which the conversion device learns, on the one hand, at which location in a primary output signal stream a character string which is to be detected and read out is to be found and, on the other hand, at which location in a secondary output signal stream the character string which has been read out is to be incorporated. In one learning stage of the configuration process, with the aid of a marking character string the conversion device obtains data about the location of the output character string which is to be read out. The marking character string is input in a known manner under the control of software present on one data processing unit. It is incorporated into the primary output signal stream in a manner corresponding to a primary output device. In the other learning process of the configuration mode a pattern character string is input in a similar manner under the control of a program running on a further data processing unit in a manner predetermined by this program, for example into an input mask. The pattern character string is also incorporated into an output signal stream and transmitted by the further data processing unit into the output memory of the conversion device. The control signals associated with the output signal stream of the further data processing unit are adapted to the requirements of a secondary output device. In both learning processes the conversion device recognizes on the one hand the marking character string and on the other hand the pattern string, detects the respective position data, produces a concatenation or association between the two items of position data and stores this concatenation. With this the configuration of the conversion device is ended, and the further data processing unit can be separated from the conversion device. Finally, in the operating mode the primary output signal stream is transformed by the conversion device into a secondary signal stream. In this case the desired character string is inherited from the primary by the secondary output signal stream, the control signals of the primary output signal stream which are adapted to a primary output device being replaced by control signals of the secondary output signal stream which are adapted to a secondary output device. At the same time any repositioning and also multiple incorporation of the inherited character strings is possible. The "learning" of the conversion device in the configuration mode can be undertaken without any knowledge of the control signals necessary for operation of the primary or secondary output device and detailed knowledge of the programs running on the data processing unit and the further data processing unit. The user merely needs to input predetermined, preferably identical, marking or pattern character strings at the locations indicated to him of the programs running on the respective data processing units and to put the conversion device into the configuration mode. The conversion device then allocates the marking character string to the pattern character string automatically and stores the necessary position and output data.

Advantageous further developments are characterized in the subordinate claims.

BRIEF DESCRIPTION OF THE DRAWINGS

The invention is explained in greater detail below with reference to embodiments illustrated in the drawings, in which:

FIG. 4A shows a section of program which generates an output signal stream in a special printer programming language, and FIG. 4B shows the printed output of the printer controlled by a section of the program according to FIG. 4*a*.

DETAILED DESCRIPTION OF THE INVENTION

Figure 1:
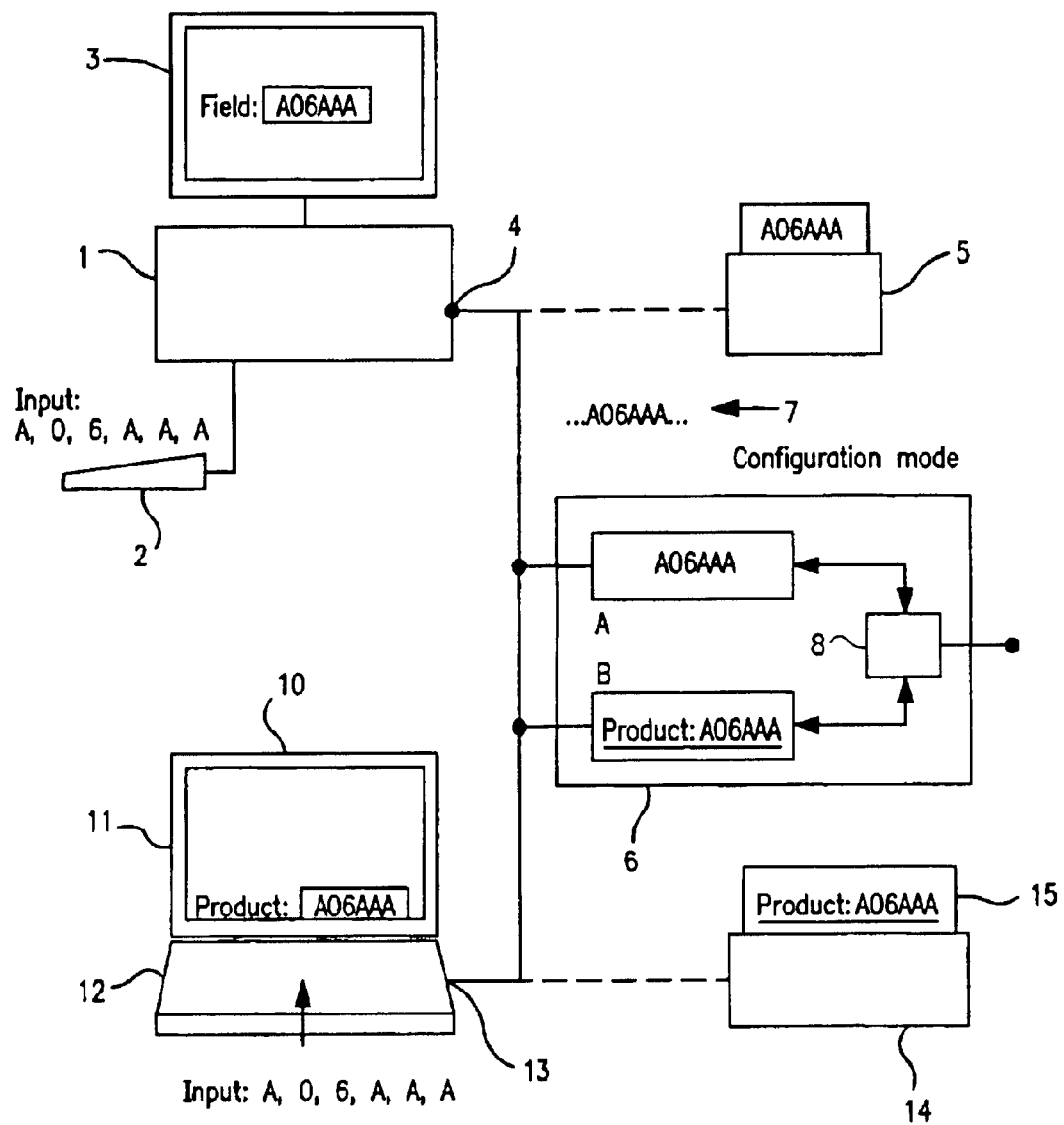
FIG. 1 shows an arrangement with which the steps of the method according to the invention which are to be executed in the configuration mode can be carried out.

FIG. 1 shows an arrangement for carrying out the steps of the configuration mode of the method according to the invention. In this case a new or further printer which selectively detects character strings output by the data processing unit and outputs them in a changed format is to be connected to an existing data processing unit. The existing data processing unit 1 has a keyboard input device 2 and a screen 3. Moreover the data processing unit 1 can be connected via an output interface 4 to a standard printer 5. A program running on the data processing unit 1 fixes the manner in which inputs on the keyboard 2 are processed and displayed on the screen 3, output via the interface 4 and printed out by the printer. The program running on the data processing unit 1 comprises program parts which allow an operator to input a character string into an input mask displayed on the screen 3. In the usual way the keyboard input signals are received, decoded, stored and corresponding display signals are transmitted to the screen 3. The operator recognizes on the screen 3 a display and beside it an input field of the input mask, a pointer or cursor directing the operator to the current input position. For example the display "field" appears on the screen. After this are six free screen positions into which a maximum of six characters can be written sequentially via the keyboard 2.

A further program part of the program run on the data processing unit 1 incorporates the character string which has been input and stored into a primary output stream to be output on the output interface 4. In this case the character string is converted into a standard output format and leaves the data processing unit 1 as a sequential character string signal sequence via the output interface 4. In the output form it can be received and interpreted. by the printer 5. It is output at an output position on a printed page which is predetermined by control signals. At the same time the position control signals in the output signal stream identify a location of the sequentially output character string in the signal stream..

In the configuration mode a marking character string, which does not occur during normal operation and which even in the configuration mode is only incorporated into the output signal stream at one single position, is input into the data processing unit 1. In the illustrated embodiment the marking character string "A06AAA" is input instead of a character string six characters long. The operator inputs a corresponding key sequence on the keyboard 2. The keyboard signals are processed by the data processing unit 1 and appear in the input field of the input mask identified by "field" on the screen. Moreover, on a corresponding output command the characters of the marking character string are incorporated into the primary output signal stream, which is shown in FIG. 1 by the character sequence 7.

The conversion device 6 receives the primary output signal stream and stores a predetermined portion in the memory A. In the configuration mode an output signal stream which corresponds to only one page of the printer 5 is generated by the data processing unit 1. In alternative embodiments a plurality of pages can also be output by the data processing unit 1 and stored in the memory A of the conversion device 6 so long as a plurality of character strings or marking character strings for detection are to be detected on successive pages.

The conversion device 6 contains a control device 8 which is connected to the memory A. The control device 8 runs a program with which the memory A is searched for marking character strings. In this case the character string "A06AAA" is found inter alia. Then position data identifying its location in the output signal stream is obtained. This position data is obtained from the control characters of the output signal stream, particularly the position control characters, likewise stored in the memory A. So long as the printer 5 to which the format of the output signal stream is adapted is a printer which arranges the characters to be printed out in lines and columns, then the line number and the column number of the first letter A of the marking character string are stored as position information. Moreover the control device 8 stores the length of the marking character string, in the present example the number of characters 6.

FIG. 1 also shows a second data processing unit 10 which in the illustrated embodiment is constructed as a laptop. This data processing unit is used only in the configuration of the conversion device. The laptop 10 has a LCD display 11 and an input keyboard 12. A printer, for example the printer 14, can be connected via an output interface 13. On the laptop a program can be run which can control the input of a character string via the keyboard 12, can then display the character string thus input in an input field of a screen mask on the LCD display 11 and on an output command can incorporate the character string into an output signal stream which is output via the output interface 13. The control signals or the format of the output signal stream are adapted to the requirements of the printer 14. The character string is output under program control so that the printer 14 prints it out on one printer page 15 at a position desired by the operator of the data processing unit 10.

The data processing unit 10 can be completely different from the data processing unit 1, just as the printer 14 can be different from the printer 5. However, both data processing units must be capable of incorporating an input character sequence into an output signal stream in the sequence in which it was input. Moreover, both printers 5 and 14 must be capable of receiving a signal stream in which a coded character sequence is incorporated and of outputting this character sequence on an output medium, for example a sheet of paper.

Then in the configuration mode, with the aid of the input keyboard 12, the same character strings are input as pattern character strings into the data processing unit 10 which are input as marking character strings into the data processing unit 1. Under program control the input character strings are represented on the display 11, for example in input fields of an input mask. In the embodiment illustrated in FIG. 1 the pattern character string "A06AAA" is input and displayed on the screen after the caption "product:". In the illustrated embodiment the display is underlined. This is intended to point out that the output signal stream output at the interface 13 contains control characters which in the case of output via the printer 14 would represent the output of the character string on page 15 in underlined form. The underlining here is representative of a large number of possible text or paragraph formattings. In particular this differing representation of the character strings is intended to indicate that the signal stream output from the data processing unit 10 can generate on the printer 14 a different graphical representation of the character string from that which the primary output signal stream output from the data processing unit 1 would generate on the printer 5.

In the configuration mode the output interface 13 of the data processing unit 10 is connected to an input interface of the conversion device 6. This may be—as shown in FIG. 1—a separate input interface; however, it may also be a common input interface for both memories A and B to which the two data processing units 1 and 10 are connected one after the other. A predetermined portion of the output signal stream of the data processing unit 10, for example the portion of the output signal stream which describes a page 15, is stored in the memory B of the conversion device 6. Then with the aid of the control device 8 the memory B is searched for pattern character strings and the pattern character strings which are found are compared with the marking character strings found in the memory A. When a pattern character string thus found in memory B corresponds to a marking character string in the memory A, then the position data of the marking character string in the memory A is allocated to the position data of the pattern character string in the memory B. In order that the control device 8 can carry out this allocation, however, the marking character strings and the appertaining pattern character strings do not have to be identical; they merely have to be in a known relation to one another. The position data of the pattern character string in the memory B is designated as output data, since it determines the output position of the character string to be output in the operating mode.

The position data (for example the line and column numbers) found by the control device of the conversion device in the memory A using the marking character strings serves in the later operating mode for finding the character strings stored at the same locations. Other control signals of the primary output signal stream of the data processing device 1 which do not also determine the position of the character string in the signal stream (for example those which would fix the font of the character string for the printer 5) are not required and therefore are ignored in the memory A or not stored therein. In the memory B, by contrast, not only is the position data allocated to the pattern character string stored for correct allocation of the character strings to be read in at these locations, but also all additional contents which should also determine the later output. For example, the memory B may contain a longer text into which the character strings to be selectively read out in the operating mode are to be incorporated at predetermined locations (the locations of the pattern character strings). The memory B may also contain graphics and control signals which influence the positioning and graphical representation of the output on the printer 14. Therefore the memory B is also designated as output memory of the conversion device 6. In one embodiment memory A and memory B can also be freely selectable memory sections of a memory device, for example a RAM, which is addressable by the control device.

Figure 2:
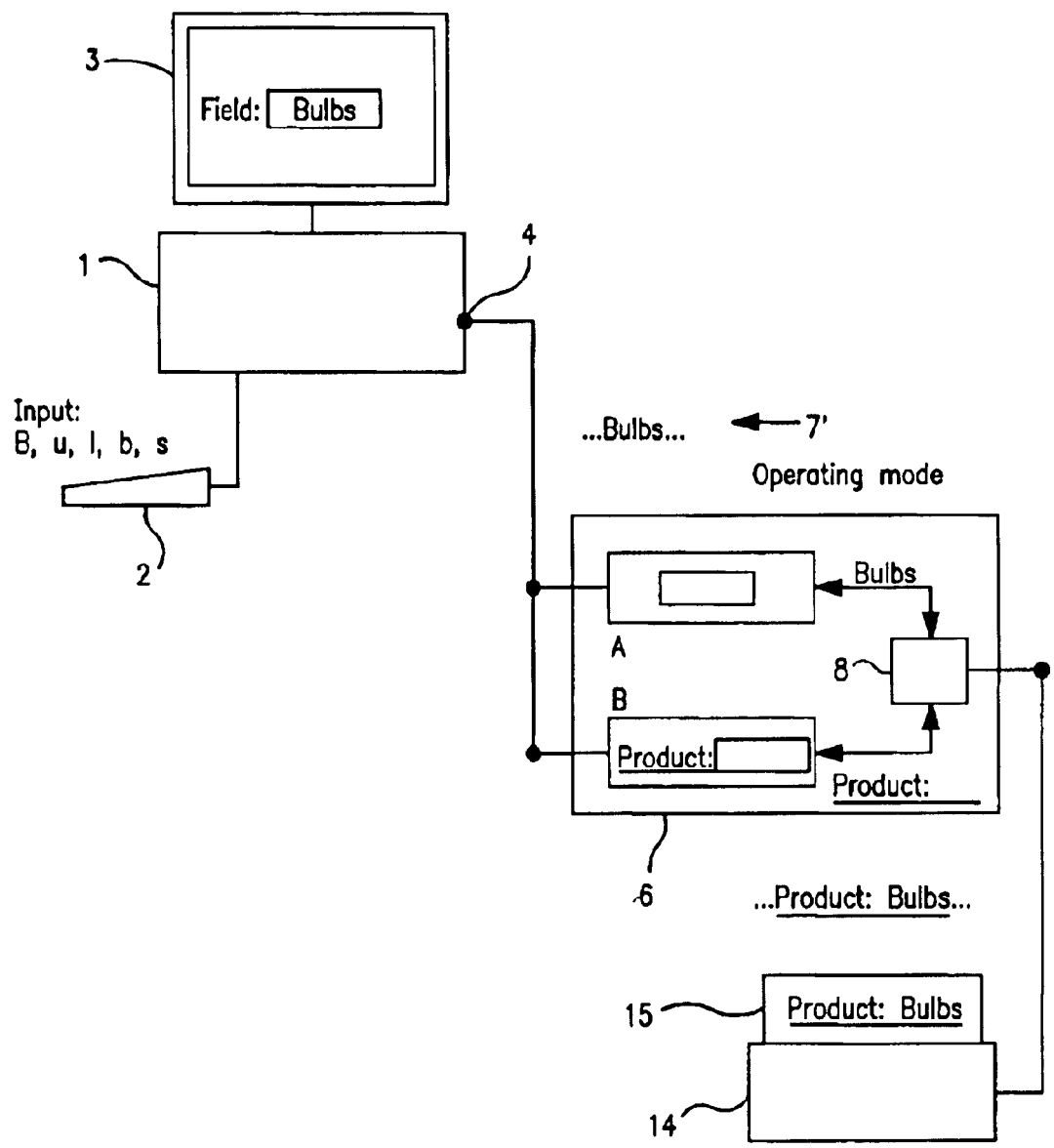
FIG. 2 shows the devices of the arrangement according to FIG. 1 which are used in the operating mode.

FIG. 2 shows the arrangement remaining in the operating mode. The data processing unit 1 with input device 2, display 3 and output interface 4 is connected via the conversion device 6 to the printer 14. The output signal stream of the output interface 4 is also formatted as if it were to control the printer 5. From this primary output signal stream the conversion device 6 generates a secondary output signal stream at its output interface 9. The formatting of the secondary output signal stream corresponds to the formatting of the signal stream output at the interface 13 of the data processing unit 10 and is adapted to the printer 14.

Under the control of the software running on the data processing unit 1 the operator inputs any character string (in the illustrated example the character string "bulbs") into a predetermined input mask with the aid of the keyboard 2. Since the software which is running is identical, this character string will be displayed in the same way and incorporated into the primary output signal stream as character sequence 7', like the marking character string ("A06AAA") in the configuration mode. In alternative embodiments the input of the character strings can also take place without operator intervention, under program control.

The conversion device receives the primary output signal stream and buffers it (page by page) in the memory A. Then the control device 8 selectively reads out at the locations predetermined by the position information the character strings which are stored there and transmits these character strings (in this case: "bulbs") to predetermined locations in the secondary output signal stream.

At the same time, under the control of the control device 8 the secondary output signal stream is generated from the memory content of the output memory B. The character strings read out from the memory A are inserted at the locations marked by the corresponding pattern character strings of the signal stream obtained from the output memory B. In this case formattings and graphical arrangements of the content of the output memory B are predetermined. In the illustrated example the character string "bulbs" is inserted into the secondary output signal stream after the character string "product:". The formatting thereby inherited from the output memory B is indicated by the underlining.

In alternative embodiments the character strings from memory A can also be transferred to begin with to the output memory B and only after that the secondary output signal stream can be generated from memory B. The printer 14 receives the secondary output signal stream and generates the corresponding output ("product:bulbs") on the page 15.

Figure 3:
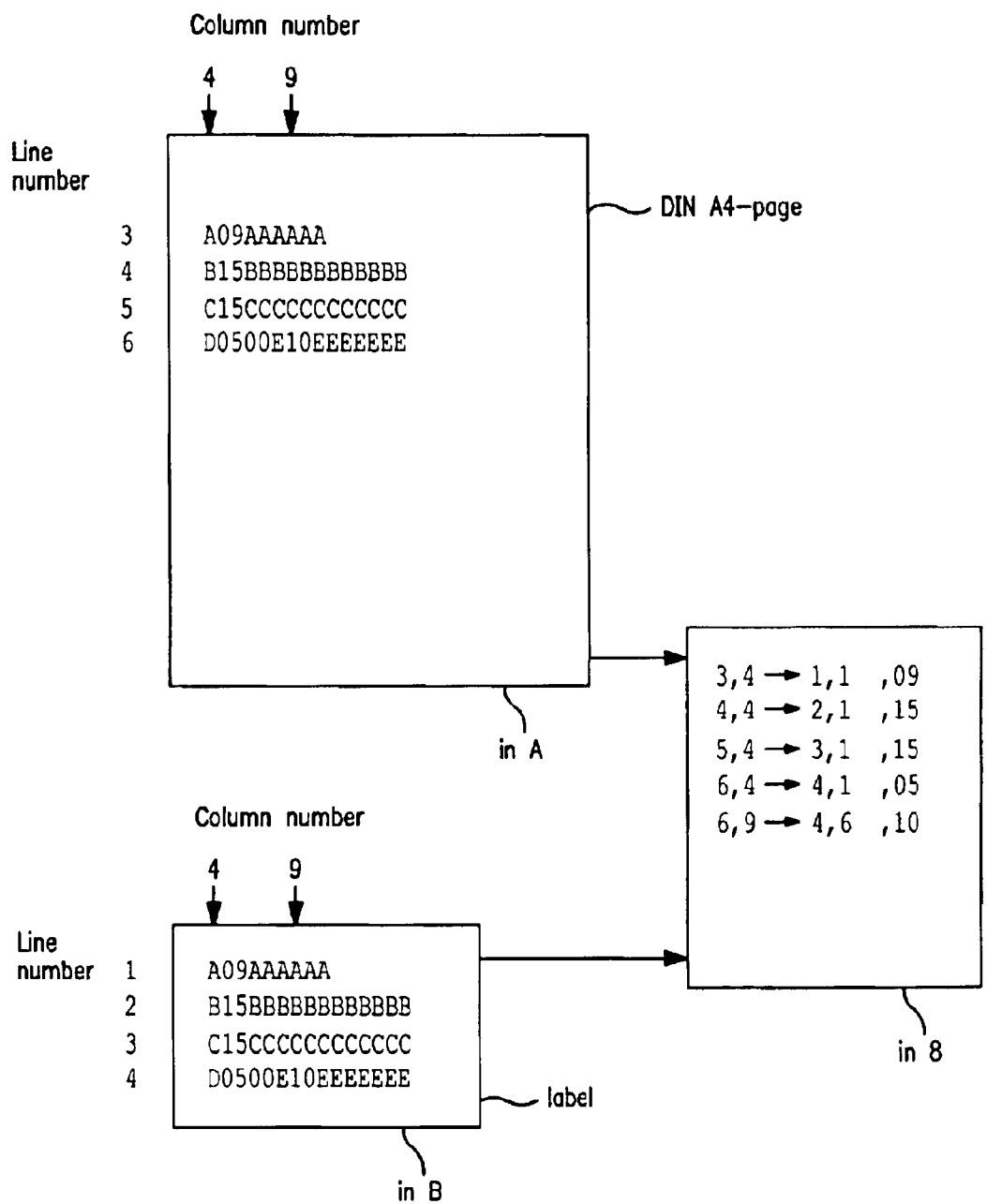
FIG. 3 shows a basic representation which illustrates the association of marking character strings and pattern character strings in the configuration mode.

FIG. 3 shows a diagrammatic representation of the position allocations obtained in the configuration mode for the marking character strings stored in the memory A and for the pattern character strings stored in the output memory B. The illustrated example shows an application in which from the letterhead of the portion of the primary output signal stream corresponding to a DIN A4 page the data representing the address are selectively read out and are used for printing labels. The labels are output to a label printer. The portion of the secondary output signal stream required for printing out of a label is stored in the output memory B. In the configuration mode the control device 8 not only searches the memory A for marking character strings but also searches the output memory B for identical pattern character strings. The corresponding position allocations are stored in a table together with the lengths of the character strings. This is illustrated on the right-hand side of FIG. 3. In the simple illustrated case only corresponding line and column numbers are stored as position data. After these the maximum lengths of the character strings are allocated.

In the operating mode a portion of the output signal stream which corresponds to a letter page is stored in each case in the memory A. The character strings beginning at the positions (3,4; 4,4; 5,4; 6,4 and 6,9) are in each case read out of the memory A until the respective maximum number of characters (9, 15, 15, 5 and 10) or a character string end signal is reached. The character strings read out in each case from a letter page are incorporated into a portion of the secondary output signal stream which contains all data for the label printer for output of a label. The control signals necessary for the output of the label, particularly the data for arranging the character strings and other format data are read out from the output memory B. The incorporation of the character strings read out from the memory A takes place at the positions (lines and columns) which were allocated by the control device 8 to the positions of the memory A. The allocation table illustrated in FIG. 3 (in 8) is preferably stored in a non-volatile memory of the control device 8. Instead of the page and column numbers, memory addresses of the memories A and B can also be associated with one another.

FIG. 4A shows a section of a computer program which at an output interface generates an output signal stream for another label printer. In this case the output signal stream encodes commands in a special printer programming language. Such an output signal stream does not enable a character string to be read out as position data on the basis of simple column and line numbers in order for example to be able to output the character string on another, new printer. Certain command sequences are transmitted to the printer. The output commands (PRINT #1) of the computer program have the following significance. First of all a series of output commands defines the locations of the label at which character strings are to be output and in which font and size. This stakes place by initialization commands in the program section I. The character strings to be output are allocated character strings numbers 20, in the illustrated example C00 to C06. X and Y co-ordinates of the points of origin of the respective character string on the label follow the character string numbers output as identification character string. An example of an output label is illustrated in FIG. 4B. The origin of the co-ordinates of the appertaining X, Y co-ordinate system is also shown in FIG. 4B. From a comparison of the section I of the commands according to FIG. 4A and the arrangement of the character strings on the label according to FIG. 4B it can for example be recognized that the character string C00 beginning at the co-ordinates X=150 and Y=10 is to be printed out.

For each type of label to be output the program sequence according to FIG. 4A contains a section II which defines the respective content of the character string identified by the character string number. From these sections the conversion device must selectively read out the respective character strings (without control signals and control commands) in the operating mode. The commands of the sections II likewise contain the character string number 20'. In the first line of the first section II the content of a character string 21 ("Bonduell Gemüsemais 850 ml") is defined for example. In a similar manner in the following section II the content of the character string is newly defined ("Kupferberg Gold 0.7 l"). The character sequence of the respective program line immediately preceding the character string in the output signal stream can be used as position data because it contains the character string number (for example C00) which is unique for each label in conjunction with certain further control characters. The control sequence of the first character string in each case which can be used as position data reads for example "CHR$(27) r c 0 0;" and consists of six characters. This character sequence can be used for finding the position of the character string 21 in the output signal stream generated by the program sequence illustrated in FIG. 4A.

In the configuration mode, instead of the character strings shown in the program a marking character string which the maximum number of possible characters is used. The conversion device detects the marking character string and stores the six immediately preceding characters as position data. In the operating mode these position data stored in the conversion device are then used in order to read out the succeeding character string at each occurrence of these position data.

In some label printer programming languages the sequence of printer commands contains commands which give the particular number of labels with the same content to be printed out in succession. In the example illustrated in FIG. 4A these are the commands which are output with the program lines III. Also this data (e.g. the character string "i0001C") can be selectively read out using the method according to the invention and then converted into the secondary output signal stream. Thus the labels (in new format) can also be printed out in the same number on the secondary printer.

What is claimed is:

1. Method for selective detection and readout of at least one character string from a primary output signal stream of a data processing unit, wherein the at least one character string is input into the data processing unit and is incorporated into the primary output signal stream output at an output interface of the data processing unit, wherein the number of characters of the at least one character string to be selectively read out in each case does not exceed a predetermined maximum number, and wherein position control signals are allocated to each character string and are inserted into a predetermined portion of the primary output signal stream, wherein the position control signals can cause a primary output device which is capable of being connected to the output interface to output the character string allocated thereto in each case at a predetermined output position of an output medium, characterized in that a conversion device connected to the output interface of the data processing unit is put into a configuration mode, that a marking character string is input into the data processing unit instead of each character string which is to be selectively detected, each marking character string forming a unique sequence of characters which does not occur in the primary output signal stream output during the normal operation, and the number of characters of the marking character string being equal to the maximum number of characters of the appertaining character string, that each marking character string with allocated position control signals is incorporated into the primary output signal stream, that the primary output signal stream is received by the conversion device and searched for marking character strings, and when a marking signal string is detected position data identifying its point of origin in the primary output signal stream is obtained from the position control signals allocated to the particular marking character string and inserted into the predetermined portion, and this position data is stored together with the number of characters of the marking character string in this conversion device, and that the conversion device is put into an operating mode in which the primary output signal stream is received, current position data is obtained form the received position control signals, the current position data is compared with each of the stored items of position data and when the current position data corresponds to stored position data the appertaining character string is read out from the primary output signal stream.

2. Method as claimed in claim 1, characterized in that a page of a two-dimensional output medium is defined by the predetermined portion of the primary output signal stream, that lines and columns of the page are defined by the position control signals preceding the character string to be detected in the predetermined portion, wherein the output position of a character of the character string is fixed unambiguously by a column number and a line number, and that in configuration mode a column number and a line number is stored as position data for each marking character string.

3. Method as claimed in claim 2, characterized in that the line and column numbers stored as position data correspond to the output position of the first character of the marking character string.

4. Method as claimed in claim 2 or 3, characterized in that:

in the operating mode a current line number and a current column number are obtained in each case as position data from the received position control signals and character strings, and that when the current line/column numbers correspond to the stored line/column numbers the subsequent characters are read out from the output signal stream until either the maximum number of characters of the character string is reached or a character string end signal is detected.

5. Method as claimed in claim 2, characterized in that the position control signals comprise those signals which indicate the start of a new page or a new line, and that the current position data is obtained and stored in a line counter for the line number and a column counter for the column number, wherein the line counter is reset to zero by a position control signal indicating the start of a new page and the column counter is reset to zero by position control signals indicating the start of a new page or the start of a new line.

6. Method as claimed in claim 2, characterized in that in the configuration mode the position control signals and character strings belonging to a page of the output medium are in each case advantageously buffered in the conversion device, that the buffered character strings are searched for marking character strings, and that when a marking character string is found the line number to be stored as position data and the column number to be stored are obtained from the preceding position control signals and character strings of the page.

7. Method as claimed in claim 6, characterized in that while the portions of the primary output signal stream buffered in a first page memory of the conversion device are searched for marking character strings and the position data are obtained form the buffered portions, the portions of the primary output signal stream forming a succeeding page of the output medium are buffered in a second page memory.

8. Method as claimed in claim 1, characterized in that for each character string an unambiguously allocated part-sequence of position control signals is inserted into the predetermined portion of the primary output signal stream, and with the aid of the part-sequence of position control signals the output device is enabled to determine the output position of the character string, that in the configuration mode the predetermined portion of the primary output signal stream is buffered and the part-sequence allocated to a marking character string in the predetermined portion is used in order to obtain the appertaining position data, and that in the operating mode the part-sequence allocated to a character string is used in order to obtain the current position data.

9. Method as claimed in claim 8, characterized in that the part-sequence is inserted into the primary output signal stream in a predetermined spatial relation to the allocated character string.

10. Method as claimed in claim 9, characterized in that the part-sequence immediately precedes the character string or runs on from it, and that a portion of the part-sequence is stored as position data.

11. Method as claimed in claim 10, characterized in that the part-sequence precedes the character string, that in the operating mode the received position control signals are continuously compared with each stored part-sequence and that when it is detected that they correspond the characters immediately following the part-sequence are read out of the buffered portions of the primary output signal stream until the maximum number of characters of the character string which are allocated to the part-sequence is reached or a character string end signal is detected.

12. Method as claimed in claim 1, characterized in that each marking character string is at least four characters long and contains at least one character which represents the respective maximum number of characters in the marking character string.

13. Method as claimed in claim 12, characterized in that the remaining characters of the marking character string are identical but different from the characters of any other marking character string.

14. Method as claimed in claim 13, characterized in that the remaining characters represent letters.

15. Method as claimed in claim 12, characterized in that the second and third characters of the marking character string represent the maximum number of characters.

16. Method as claimed in claim 1, characterized in that after readout of the at least one character string a secondary output signal stream depending upon the at least one character string which has been read out is output to a secondary output device connected to an output interface.

17. Method as claimed in claim 16, characterized in that the secondary output signal stream contains signals which cause the secondary output device to output a character sequence in each case which is dependent upon the character strings read out.

18. Method as claimed in claim 17, characterized in that the secondary output signal stream contains each of the character strings which have been read out.

19. Method as claimed in claim 17, characterized in that in the configuration mode apart from the number of characters in the marking character string an item of output data is allocated and stored for each stored item of position data, wherein the output data defines the content and the location of the output of the character sequence dependent upon the character string which has been read out.

20. Method as claimed in claim 19, characterized in that the secondary output signal stream is formed from output data stored in an output memory, that the character strings which have been read out are written into predetermined output memory locations of the output memory as part of the output data before the formation of the secondary output signal stream, and that in the configuration mode at least one address of a predetermined output memory location is allocated to each stored item of position data as output data.

21. Method as claimed in claim 20, characterized in that the at least one address of a predetermined output memory location is allocated in that a pattern character string is stored at the at least one predetermined output memory location, wherein the pattern character string stands in a predetermined relation to the marking character string allocated to the stored position data, after the detection of a marking character string the output memory is searched for pattern character strings, and when a pattern character string standing in the predetermined relation to the marking character string is found the output storage location thereof is stored in association with the position data.

22. Method as claimed in claim 21, characterized in that the pattern character string and the allocating marking character string represent identical character sequences.

23. Method as claimed in claim 21, characterized in that in the configuration mode for storage of the pattern character string in the output memory an input mask associated with the output medium of the secondary output device is displayed on a display device, a pattern character string is input by a user at an input location of the input mask, and the pattern character string is transmitted to an output storage location allocated to the input location.

24. Method as claimed in claim 23, characterized in that in the configuration mode the conversion device is connected to a further data processing unit, that the pattern character string is input into an input mask displayed on the display device of the further data processing unit under the control of a program running on the further data processing unit, and that the pattern character string is then transmitted together with other data from the further data processing unit into the output memory of the conversion device.

* * * * *